(12) United States Patent
Carr et al.

(10) Patent No.: US 7,499,877 B2
(45) Date of Patent: Mar. 3, 2009

(54) METHOD AND APPARATUS FOR DYNAMICALLY MAINTAINING AND EXECUTING DATA DEFINITIONS AND/OR BUSINESS RULES FOR AN ELECTRONIC PROCUREMENT SYSTEM

(75) Inventors: Richard Carr, Ashburn, VA (US); Rajiv Raghavendrarao Gidadhubli, Centreville, VA (US); Ismail Mohideen, Centreville, VA (US); The-Hao Marc Nguyen, Arlington, VA (US)

(73) Assignee: American Management Systems, Fairfax, VA (US)

( * ) Notice: Subject to any disclaimer, the term of this patent is extended or adjusted under 35 U.S.C. 154(b) by 1203 days.

(21) Appl. No.: 09/788,611

(22) Filed: Feb. 21, 2001

(65) Prior Publication Data

US 2002/0156687 A1    Oct. 24, 2002

(51) Int. Cl.
    *G06Q 30/00*    (2006.01)
(52) U.S. Cl. .............................. 705/26; 705/27; 705/76
(58) Field of Classification Search ................... 705/26, 705/27, 76
    See application file for complete search history.

(56) References Cited

U.S. PATENT DOCUMENTS

| 5,675,784 | A |  | 10/1997 | Maxwell et al. |
| 5,758,327 | A |  | 5/1998 | Gardner et al. |
| 5,761,649 | A |  | 6/1998 | Hill |
| 5,839,117 | A | * | 11/1998 | Cameron ...................... 705/27 |
| 5,970,475 | A |  | 10/1999 | Barnes et al. |
| 6,026,383 | A |  | 2/2000 | Ausubel |
| 6,598,026 | B1 | * | 7/2003 | Ojha ........................... 705/26 |
| 6,950,809 | B2 | * | 9/2005 | Dahan et al. .................. 705/76 |

FOREIGN PATENT DOCUMENTS

| JP | 7-230502 | 8/1995 |
| JP | 8-235206 | 9/1996 |
| JP | 9-128451 | 5/1997 |
| JP | 9-305356 | 11/1997 |
| JP | 9-305672 | 11/1997 |
| JP | 10-240830 | 9/1998 |
| WO | WO 95/26004 | 9/1995 |

* cited by examiner

*Primary Examiner*—Yogesh C Garg
(74) *Attorney, Agent, or Firm*—Staas & Halsey LLP

(57) ABSTRACT

An apparatus, method, and computer readable storage medium for dynamically maintaining data structures and executing business rules in an electronic procurement system. The method includes (a) dynamically maintaining a plurality of organizational profiles containing data structures, a plurality of users each being associated with a particular organizational profile; and (b) implementing a user requested transaction on a hosted e-procurement system with an application system by using information from the data structures stored in an organizational profile associated with the user.

9 Claims, 11 Drawing Sheets

METHOD AND APPARATUS FOR DYNAMICALLY MAINTAINING AND EXECUTING DATA DEFINITIONS AND/OR BUSINESS RULES FOR AN ELECTRONIC PROCUREMENT SYSTEM

BACKGROUND OF THE INVENTION

1. Field of the Invention

The present invention relates to a method, apparatus, and computer readable storage for dynamically maintaining and executing data definitions and business rules in an electronic procurement system. More specifically, the present invention relates to a method, apparatus, and computer readable storage which allows a plurality of users to easily create, modify and dynamically maintain their business rules and data definitions for use with an electronic procurement ("e-procurement") system, without requiring outside intervention for such tasks as recompiling. The present invention further allows an electronic procurement system to be capable of integrating with multiple application systems.

2. Description of the Related Art

E-procurement systems allow an entity to conduct transactions such as browsing for, selecting, approving, and actually purchasing goods from a supplier. The entity can typically be a department of the government, private business structure, or any other type of organization or entity that purchases goods. For example, the entity can represent a government agency or business, departments within the government agency or business, or even individual buyers.

When, for example, a government agency arranges to make a purchase, typically there are individual approvers and/or a chain of approvers that have to approve the purchase. If the government agency decides to purchase a new computer monitor, a person in charge of computer equipment may have to individually approve the purchase. This is considered a business rule. In addition, if the purchase exceeds a first preset amount of money, then a first financial officer may have to approve the purchase. If the purchase exceeds a second preset amount of money, then a second financial officer may also have to approve the purchase, after the first financial officer approves. This "approval chain" of the first and second financial officers represents the "workflow" for the government agency. Workflow is a type of business rule, although a business rule may not be considered a workflow if it does not contain an approval chain.

Another type of business rule used by e-procurement systems is a default field for users. In a typical e-procurement system, default codes, such as accounting codes, are maintained by a system administrator. One example of an accounting code can be, for example, a bank account number. A particular user of an e-procurement system may need to draw from a particular bank account number, and of course it is advantageous to the user if this particular bank account number is automatically used for each purchase. Having accounting codes stored and automatically used for transactions reduces errors, and having the correct codes is crucial if transactions are to be sent to and accepted by other systems. For a large organization (for example the government), the work needed to accurately maintain proper defaults for thousands of users can become prohibitive.

Further, some departments (or even individual users) within an organization may require different defaults (or business rules). For example, different users from the same organization could use different fund codes for computer purchases and require different defaults. Another example is certain users may want to do a pre-encumbrance (reserving of funds before a purchase), while other users may not. These types of business rules typically require a great deal of customization for each unique situation.

E-procurement systems often need to integrate with external application systems such as financial system, inventory systems or enterprise resource planning (ERP) systems. When an e-procurement system needs to interact with an external system, the prior art requires that a custom program be written to implement data communication between the e-procurement system and the application system.

Sometimes, specific data required by the application system is not available in the e-procurement system. Also, there can be fields that users desire to store that are not available for storage on the particular e-procurement system being used, for example fields directed to reporting purposes but not used in any way by the e-procurement system.

When a government or private entity is set up to make purchases using an electronic procurement system, business rules can/or user specific data fields need to be programmed into the electronic procurement system in order for the business rules and/or data fields to be implemented electronically. Typically, the programming of the business rules and/or data fields is accomplished by having to call technicians from the manufacturer of the electronic procurement system in order for them to program (or reprogram) the business rules and/or data fields. When the entity desires to change the business rules and/or data fields, the technicians are needed again to reprogram the business rules and/or data fields in the electronic procurement system. The reprogramming is typically carried about by modifying the source code used for implementing the, business rules and/or data fields and then recompiling the new source code. Thus the prior art business rules and/or data fields can be considered "hard-coded." Another disadvantage to custom coding or hard-coding the business rules and/or data fields is that the electronic procurement system must be taken offline and be made unavailable during this process.

In addition to the problem of non-dynamic or customized hard-coded business rules and data fields, prior art electronic procurement systems also lack scalability. Typically, an electronic procurement system needs to interface with external systems in order to implement transactions such as electronic reservation of funds. However, prior art electronic procurement systems have difficulty interfacing with more than one external system. Interfacing with more than one external system requires extra system resources, for example extra hardware, and also may require modifications of the e-procurement system to handle different data fields. In addition, interfacing with multiple external systems requires multiple executables (an executable can be defined as a process running in memory) of the procurement system. Using multiple executables is not desirable in that it results in a more unreliable system as well as requires more resources. In addition, sharing of data may present a problem when running multiple executables.

FIG. 1A is a block diagram illustrating a simplified example of a typical electronic procurement system implementing business rules and workflow of the prior art.

Referring now to FIG. 1A, a buyer 1 104 communicates a purchase request to the e-procurement system 100 via a computer communications network 103 or communication line 103. The e-procurement system 100 includes business rules and workflow storage 101 for the buyer 104. The e-procurement system 100 also contains catalog storage 115 and a network engine 114. The network engine 114 is used to communicate with suppliers and receive catalog information, which in turn is stored in the catalog storage 115. Assuming that a particular purchase request by the buyer 1 104 requires approval from approver 1 106, the e-procurement system 100 sends an approval request to approver 1 106 via a communication line 105. The approval request is typically sent via e-mail, although any communication method, such as voice mail, paper mail, or even wireless transmission, can be used. Approver 1 106 sends his or her approval back to the e-procurement system 100 via the communication line 105.

If approver 1 did not approve the purchase request, then the e-procurement system 100 sends back a denial to buyer 1 104 via the communications line 103. Assuming approver 1 approves the purchase order, the e-procurement system 100 sends financial information regarding a purchase request to a financial system 1 112 via communication line 111 in order to arrange for securing the funds and arrange payment to the supplier.

The e-procurement system 100 also sends purchase information regarding the purchase request to a supplier 110 via a computer communications line 109. The purchase information typically includes information such as the items desired for purchase, quantity, etc. The financial system 1 112 sends payment information to the supplier 110 via a computer communication line 113, which can include electronic payment.

Similarly, buyer 2 109 also can make a purchase request to the same e-procurement system 100. Note however, that buyer 2 109 may have different business rules (and workflow) that buyer 2 109 must abide by (as opposed to other buyers using the e-procurement system 100 such as buyer 1 104). In the case of FIG. 1A, buyer 2 109 needs approval from approver 2 108, before the purchase request by buyer 2 109 is approved. Buyer 2 109 also requires interaction with financial system 1 112 via the e-procurement system 100 via communication line 111.

Note that buyer 1 104 and buyer 2 109 both belong to organization A 116, which requires interaction with financial system 1 122. An organization can be an entire business or government entity, a subset of an entity, or even a single person. In FIG. 1A, all members of organization A 116 who create transactions via the e-procurement system 100 require interaction with financial system 1 122.

Many financial or ERP systems exist. However, each such financial system requires a different database structure, communication protocol, or "handshake" for communicating with purchasing computers. If it was desired to integrate with a new financial system, the prior art afforded no easy and efficient way to achieve such an integration. In addition, different buyers may need to employ different sets of business rules and/or data fields. The prior art afforded no easy and efficient way to allow different buyers to have different business rules and/or data fields, while using the same electronic procurement system.

FIG. 1B is a diagram illustrating one approach the prior art uses to allow different buyers from different organizations, each organization requiring interaction with an e-procurement system and a different financial system and having a different set of business rules and/or data fields. The approach illustrated in FIG. 1B is a "dedicated system" or "unhosted model" approach, wherein an additional e-procurement system is used for each organization.

Referring now to FIG. 1B, buyer 1 118 belongs to organization A 117. Buyer 2 122 belongs to organization B 121. Organization A 117 requires interaction with financial system 1 120, while organization B 121 requires interaction with financial system 2 124. Note that this situation is in contrast to FIG. 1A, where both buyers interacted with the same financial system because they are from the same organization. Buyer 1 118 communicates with e-procurement system 1 119, which implements transactions with financial system 1 120. Similarly, buyer 2 122 communicates with e-procurement system 2 123, which implements transactions with financial system 2 124. Note that in FIG. 1B, buyer 1 118 and buyer 2 122 have different business rules and/or data fields associated with them.

The unhosted model implementation illustrated in FIG. 1B is disadvantageous in that an entire e-procurement system is dedicated to each organization. This can be a waste of resources in that each e-procurement system 119, 123, may not use all of its own resources. The resources used by both e-procurement system 1 119 and e-procurement system 2 123 may be small enough to run on only one e-procurement system, instead of two.

FIG. 1C is a diagram illustrating a "hosted" model. The e-procurement system 125 maintains multiple executables for each of buyer 1 127 and buyer 2 129. Typically, in the hosted model, each buyer would have a dedicated executable. A user's dedicated executable can interface with the proper financial system and execute the user's own business rules.

Referring now to FIG 1C, buyer 1 127 has executable 1 131 dedicated to processing transactions for buyer 1 127 and organization A 138. Executable 1 131 interfaces with financial system 1 135, using special routines written to properly communicate with financial system 1 135. Executable 1 131 also implements the business rules for buyer 1 127. Similarly, buyer 2 129 has executable 2 133 dedicated to processing transactions for buyer 2 129 and organization B 139. Executable 2 133 interfaces with financial system 2 137, using special routines written to properly communicate with financial system 2 137. Executable 2 133 also implements the business rules 2 129.

Thus, even though buyer 1 127 belongs to organization A 138 which requires financial system 1 135 and organization A's business rules, and buyer 2 129 belongs to organization B 139 which requires financial system 2 137 and organization B's business rules, both buyers can still share the same e-procurement system 125.

However, the problem with the configuration as illustrated in FIG. 1C is that assigning a dedicated executable for each buyer having unique characteristics is inefficient as far as resources are concerned. A typical e-procurement system can only run a limited number of executables at one time. Further, adding new financial systems is difficult because each new financial system has a different protocol that it requires. Therefore, cumbersome programming in the e-procurement system is required in order to accommodate different financial systems.

Furthermore, prior art e-procurement systems have difficulty interfacing with more than one external system. Different users may need to employ different business rules and/or different sets of data including different sets of fields and their respective values. Especially with the hosted model described above, the e-procurement system has to deal with users from multiple organizations which interact with multiple application systems, each user or organization requiring their own sets of data fields. It would not be efficient or cost-effective to customize an e-procurement system with hard coded business rules and/or data fields for each client organization or for each different application system.

Therefore, what is needed is an efficient, dynamic system that can dynamically maintain and execute business rules and/or data fields for an e-procurement system with multiple users, which require different business rules and/or data fields for interfacing with external systems. What is also needed is a scalable procurement system that can efficiently interface with multiple external systems, using one executable of the electronic procurement system.

SUMMARY OF THE INVENTION

Accordingly, it is an object of the present invention to provide a method and apparatus for improving electronic procurement systems, including the ability to dynamically maintain and execute data definitions and business rules in an electronic procurement system Additional objects and advantages of the invention will be set forth in part in the description which follows, and, in part, will be obvious from the description, or may be learned by practice of the invention.

The foregoing objects of the present invention are achieved by providing a method which dynamically maintains organizational profiles.

In addition, objects of the present invention are also achieved by providing the above method on a computer readable storage medium instructing a computer to perform the method.

Moreover, objects of the present invention are achieved by providing e-procurement system which uses dynamically maintained organizational profiles.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
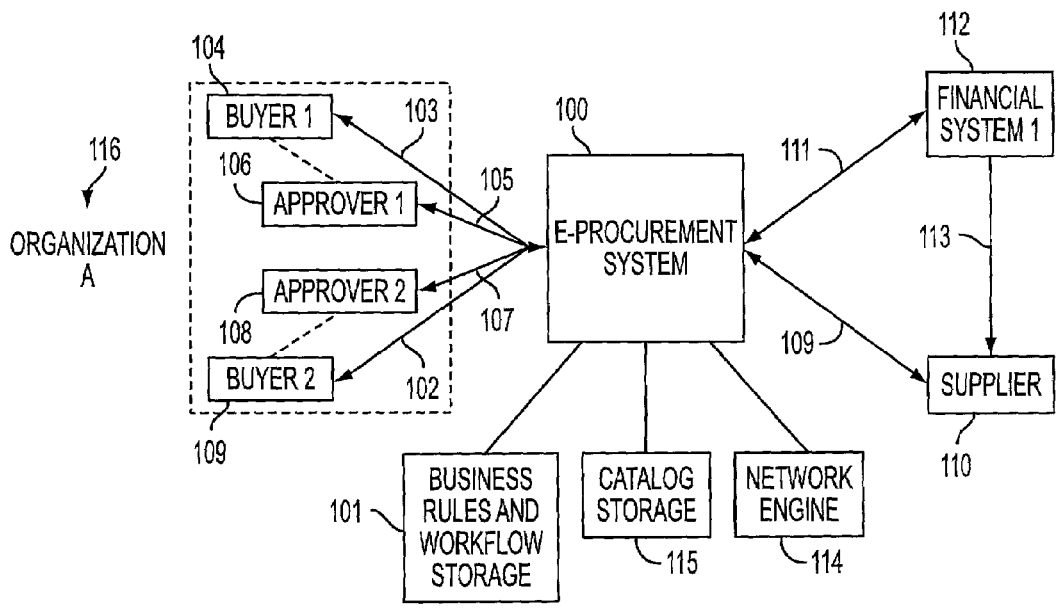
FIG. 1A is a block diagram illustrating a simplified example of a typical electronic procurement system implementing business rules and workflow of the prior art.

Reference will now be made in detail to the present preferred embodiments of the present invention, examples of which are illustrated in the accompanying drawings, wherein like reference numerals refer to like elements throughout.

Figure 1B:
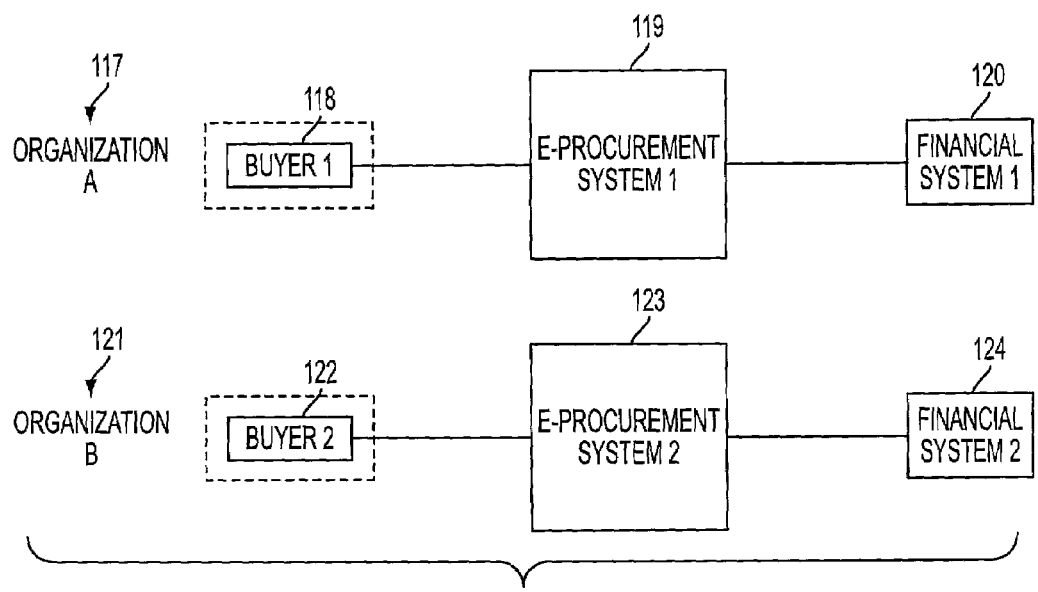
FIG. 1B is a diagram illustrating one approach the prior art uses to allow different buyers from different organizations, each organization requiring interaction with a different financial system.

An e-procurement system is an automatic system, implemented by a computer, which allows a buyer to conduct any type of purchase from an electronic catalog system. An e-procurement system would typically include catalog storage, a database system electronically connected to a network engine. The network engine would typically be connected to a plurality of suppliers. Ariba, Inc. provides a commercially available e-procurement system, which can be used as e-procurement system (FIG. 1, 100). The Ariba Network is an example of a commercially available network engine that can be used as the network engine (FIG. 1, 114). Commerce One and Intelisys are other companies that provide commercially available electronic catalog systems.

An application system is a system with which an e-procurement system communicates and performs an operation at the request of the e-procurement system. An example of an application system that may need to interact with an e-procurement system would be an inventory system. Another example of an application system is a financial system which is an application system that is used to track and manage financial resources. For example, a financial system can establish financial obligation for the purchase, encumber funds, etc. Financial systems have been called Enterprise Resource Planning (ERP) systems or "back office systems." One example of a financial system is ADVANTAGE, available from AMERICAN MANAGEMENT SYSTEMS.

While electronic procurement systems and financial systems have been widely used, electronic procurement systems in the past have suffered from a lack of scalability. Adding buyers from new organizations with different business rules and financial systems results in difficulties accommodating the new buyers and financial systems in terms of hardware and software.

Figure 1C:
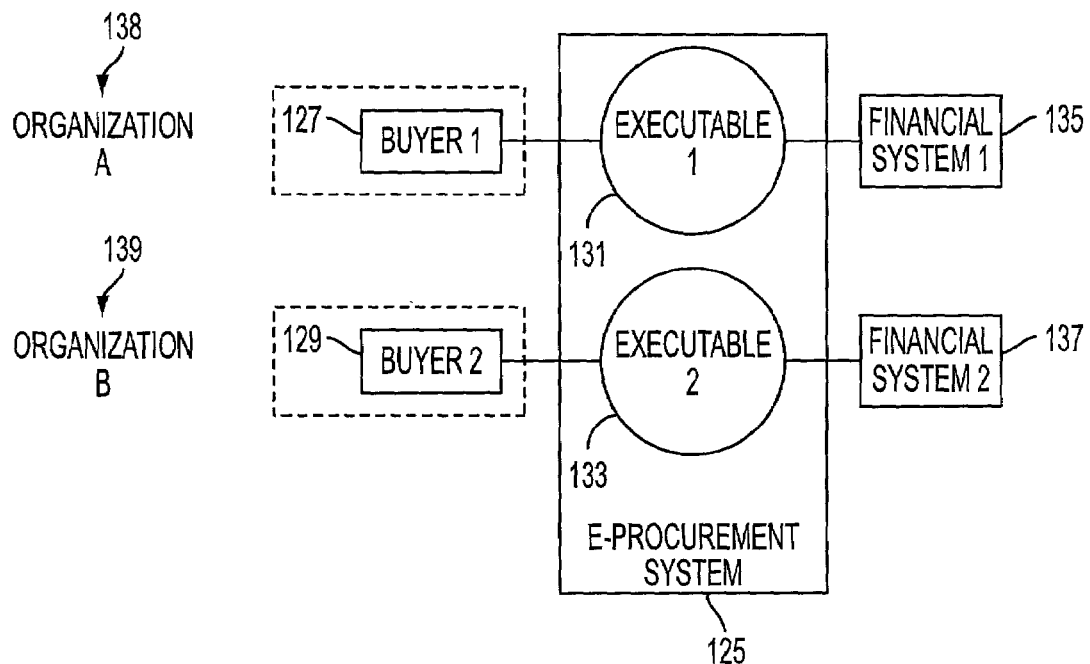
FIG. 1C is a diagram illustrating a "hosted" model using multiple executables to allow different buyers from different organizations to integrate e-procurement system with multiple financial systems.

In order to avoid the disadvantages of using multiple executables of an e-procurement application for different buyers as illustrated in FIG. 1C, a "shared executable hosted system" can be used.

Figure 2:
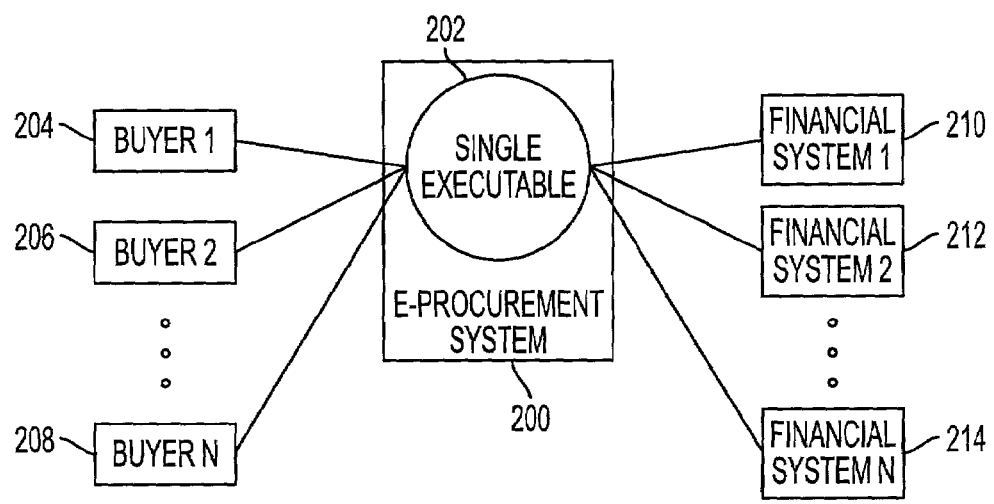
FIG. 2 is a diagram illustrating a shared executable hosted model of an e-procurement system, according to an embodiment; of the present invention.

FIG. 2 is a diagram illustrating a shared executable hosted model of an e-procurement system using the technology of the present invention. A shared executable hosted system is an e-procurement system in which multiple buyers from multiple organizations can use the system without having to use multiple executables as illustrated in FIG. 1C.

Referring now to FIG. 2, buyer 1 204, buyer 2 206 . . . buyer N 208 all access the e-procurement system 200. Each buyer has a unique set of business rules, fields, and associated information, and an associated financial system. In this example, each buyer belongs to a different organization and is associated with a different financial system. All of each buyer's unique information is stored on the e-procurement system 200. Buyer 1 204 utilizes financial system 1 210 and buyer 1's business rules, while buyer 2 206 utilizes financial system 2 212 and buyer 2's business rules, and buyer N 208 utilizes financial system N 214 and buyer N's business rules.

Instead of the multiple executables all running as illustrated in FIG. 1C, the shared executable hosted e-procurement system 200 can typically have one executable 202 processing buyer 1 204, buyer 2 206 . . . buyer N 208. One example of a shared executable hosted e-procurement system is BUYSENSE.COM, available from AMERICAN MANAGEMENT SYSTEMS.

There are many advantages of the shared executable hosted system over the prior art system as illustrated in FIG. 1C. The prior art system may run out of resources if too many unique buyers attempt to use the system, as each executable requires system resources such as memory and processor time. However, the shared executable hosted system can handle a large number of unique buyers because the hosted system preserves resources by limiting the number of executables running on the e-procurement system. In addition, a company that may not have (enough money to purchase an entire e-procurement system, nevertheless can "share" space on a shared executable hosted system for a cheaper amount than buying an entire system. This method can also be more cost-effective because a revenue model could be used that is based on the number of transactions processed.

Figure 3:
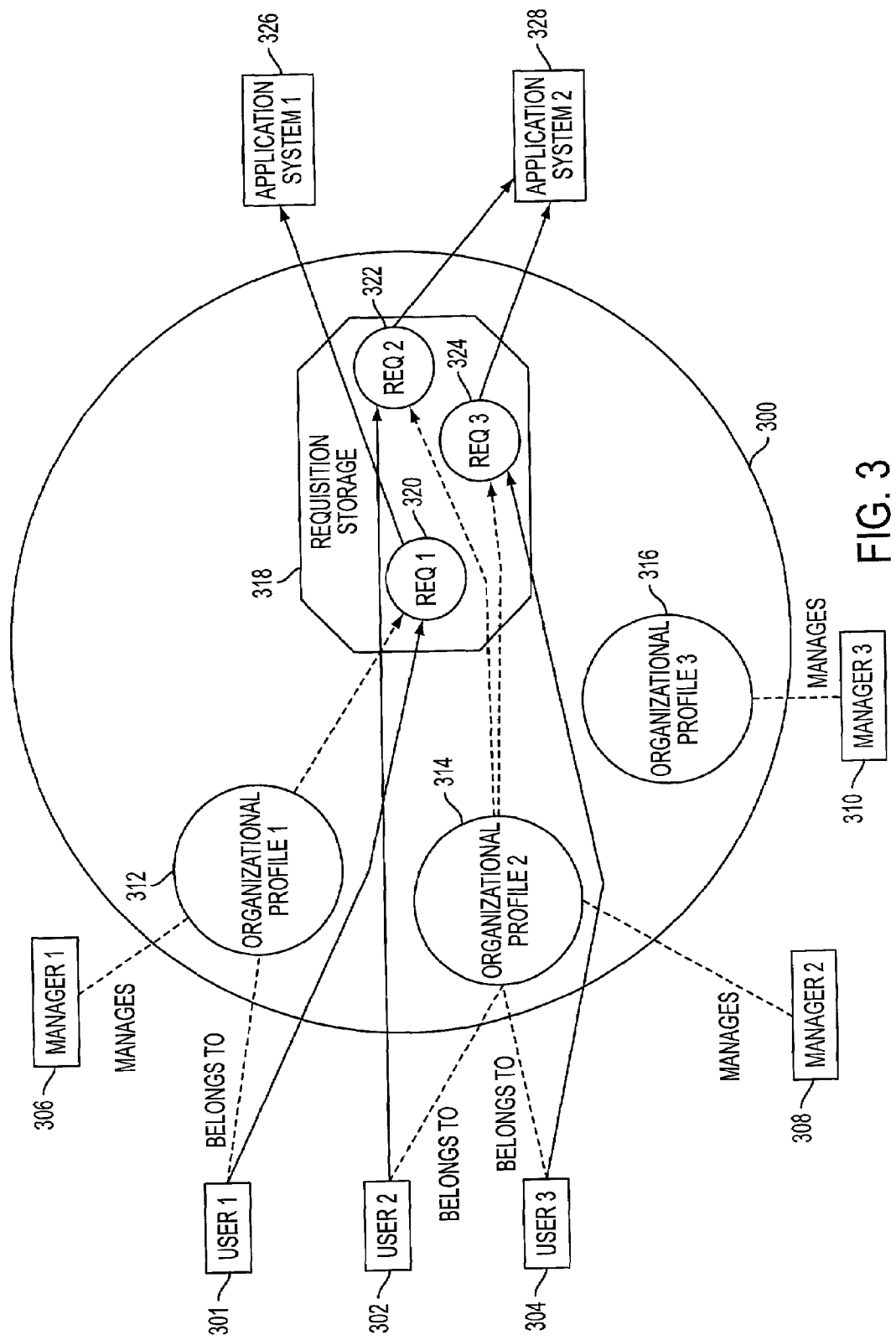
FIG. 3 is a figure illustrating one example of the relationship between parties and data stored in the e-procurement system 300, according to an embodiment of the present invention.

FIG. 3 is a figure illustrating one example of the relationship between parties and data stored in the e-procurement system 300, according to one embodiment of the present invention.

Organizational profiles contain data which typically store information relevant to a particular organization and the organization's purchases (requisitions). The organizational profiles typically store business rules and also can include workflow. Business rules can also typically include data related to purchases or requisitions called accounting preferences. These preferences can include items such as billing addresses, account numbers, and how an organization typically pays for ordered goods. Business rules also can be workflow related such as what is the chain of approvers that have to approve the purchase. The chain of approvers can be based on the type of commodity being purchase, the amount of the item the department, etc. Business rules can also include integration preferences or preferences of integrating with external systems.

In addition to business rules, data definitions are also stored within the organizational profile. Data definitions are used to extend the data model of the e-procurement system. These data definitions are used to define any information needed for integrating with application systems, or for reporting purposes. Data definitions can include fields added by a user to store additional information not already stored on the e-procurement system.

A data definition may contain associated predefined logic. For example, a particular data definition may represent a particular fund used to make purchases. Names associated with these funds and numbers which may possibly be associated with the funds themselves are completely customizable by the user or manager. The actual routines which allow a data definition to interact with the e-procurement system and application systems can be pre-programmed into the e-procurement system. Thus, typically, a manager would specify possible bank accounts and names of these accounts, while a user could actually select which account to use. The e-procurement system automatically will interact with application systems using the selected bank account, thus freeing the manager(s)/user(s) from having any knowledge about the inner workings of the e-procurement system.

Data definition information within an organizational profile can include field name, data type, label name and how the field will be displayed. The information in the data definition is used by the e-procurement system to retrieve and display appropriate information, including custom defined fields for a user based on their organizational profile. For example, a requisition screen or payment screen within the e-procurement system could look and behave differently for one user than for another user because the users belong to different organizational profiles.

The data definitions can also store a flexible number of user defined fields. Each organization decides how many fields are needed and defines labels for the fields within the organizational profile. Preferences for the fields can also be defined to provide possible values and a default value for the respective field. User-defined fields left unused will be hidden from view within the e-procurement system.

Tables I and II illustrate how the user-defined fields are defined within the organizational profile.

TABLE I

Field Table

| ClientID | ClientName | Field | ERPValue |
|---|---|---|---|
| ASU001 | ADV_01 | Field1 | Agency |
| ASU001 | ADV_01 | Field2 | Fund |
| ASU001 | ADV_01 | Field3 | Object |
| ASU001 | ADV_01 | Field4 | Organization |
| ASU001 | ADV_01 | Field5 | N/A |
| . . . | . . . | . . . | . . . |
| ASU001 | ADV_01 | FieldN | N/A |

Table I, entitled, "Field Table," defines the labels for all the extended attributes. If there is a value contained in the field, it will be used within the e-procurement system. For example, from Table I, organizational profile "ASU001" has a first field labeled "Agency." In the event that the fields contain no value such as "N/A," the fields will be hidden from view.

TABLE II

Field Data Table

| ClientID | ClientName | Field | TagName | Value | Default |
|---|---|---|---|---|---|
| ASU001 | ADV_01 | Field1 | Name | 001 | Y |
| ASU001 | ADV_01 | Field1 | Description | Mayor's Office | Y |
| ASU001 | ADV_01 | Field1 | Name | 002 | N |
| ASU001 | ADV_01 | Field1 | Description | Comptroller's Office | N |
| ASU001 | ADV_01 | Field2 | Name | EXP | N |
| ASU001 | ADV_01 | Field2 | Description | Expense Fund | N |

TABLE II-continued

Field Data Table

| ClientID | ClientName | Field | TagName | Value | Default |
|---|---|---|---|---|---|
| ASU001 | ADV_01 | Field2 | Name | CAP | Y |
| ASU001 | ADV_01 | Field2 | Description | Capital Fund | Y |

Table II, entitled "Field Data Table," serves as a data repository for all of the valid values for the extended fields. This table also lists the defaults as they should appear within the e-procurement system. For example, the first user-defined field for the organizational profile ASU001 is "Agency" (from Table I) and the possible values for this field are "001" indicating "Mayor's Office," or "002" indicating "Comptroller's Office" (from Table III). Also, Table II indicates that value "001" designating "Mayor's Office" is the default value. Thus, unless a user (or administrator) changes the default to the other choice "002," designating "Comptroller's Office," the "001" value will be used for transactions.

At implementation time, space is allocated within the e-procurement data model for the extended fields. However, as each organization starts using the e-procurement system, the organization determines how much of that space, if any, they want to use. As in the shared executable host model, each time a new organization waits to start using the same e-procurement system, the organization only needs to define which fields are needed as extended attributes.

The e-procurement system usually provides some mechanism to get outside data into its data model. For example, the Ariba Buyer e-procurement system works in conjunction with a product from a company called TIBCO to create mapping tools (called "MBSheets") telling the e-procurement system where outside data is and where it should go in the object data model. The e-procurement system then utilizes that information to actually create the tables/data structures for the data within the e-procurement data model.

Referring now to FIG. 3, in this particular example, the e-procurement system 300 stores three organization profiles, organizational profile 1 312, organizational profile 2, 314, and organizational profile 3 316.

A user typically can be associated with only one organizational profile at any given time. User 1 301 has previously selected organizational profile 1 312 as his or her organizational profile, and is therefore associated with organizational profile 1 312 (more about the selection process below). User 2 302 is associated with organizational profile 2 314. User 3 304 is also associated with organizational profile 2 314. Note that more than one user can be associated with the same organizational profile. Also note that an organizational profile can exist without having a user associated with it. An organizational profile can be created and defined with business rules and data structures before any users are associated to it. In this example, organizational profile 3 316 does not have an associated user at this time.

Each organizational profile also has a manager associated with it. Depending on the embodiment implemented, the manager may be the only user associated with the organizational profile that has the power to make changes to some or all of the organizational profile's fields. Manager 1 306 manages organizational profile 1 312. Manager 2 308 manages organizational profile 2 314. Manager 3 310 manages organizational profile 3 316.

When the e-procurement system 300 receives a purchase request from a user, the e-procurement system 300 carries out the business rules and data definitions for the organizational profile associated with that particular user.

When the e-procurement system 300 finishes applying the business rules and data definitions and ultimately approves a transaction for a user, then the e-procurement system 300 implements the transaction with an appropriate application system. The e-procurement system 300 implements the transaction according to the relevant data stored in the respective organizational profile.

For example, suppose user 1 301 makes purchases from the e-procurement system 300, the business rules and data definitions associated with organizational profile 1 312 is activated. When user 1 310 creates a requisition 1 320 or purchase order, selected data elements from the user's organizational profile 312 appear on the requisition form. Some data elements on the requisition object 1 320 are defined by the e-procurement system data model while other data elements are uniquely defined based on the data definition stored in the organizational profile. If the user has specified a default for those data elements within the organizational profile, the default values will appear. Otherwise, the information can be entered by the user. The user can also typically override any defaults if needed.

Next, the e-procurement system 300 applies the business rules from the data definitions stored in organizational profile 1 312, including seeking approval from required approvers (not pictured). After the business rules are successfully carried out (i.e. all the necessary approvers have approved), then the e-procurement system 300 needs to implement the purchase request with application system 1 326.

In order for the e-procurement system 300 to implement the purchase request of user 1 301 with application system 1 326, a requisition object is typically created in a requisition storage 318. The e-procurement system 300 contains the requisition storage 318, which stores requisition objects for each requisition. A requisition object is a data file (or object) which contains the necessary information in order to implement a transaction with an application system.

When a purchase is implemented, an integration preference (which is stored on the organizational profile being used) is typically used to determine how to interact with the application system. For example, the integration preference specifies which payment options to use for the purchase.

Similarly, when user 2 202 makes a purchase request which is subsequently approved, information from the purchase request is stored in requisition object 2 322. In addition, information from organizational profile 2 is stored in requisition object 2 322. Information in requisition object 2 322 is then transferred to application system 2 328 by the e-procurement system 300.

Similarly, when user 3 304 makes a purchase request which is subsequently approved, information from the purchase request is stored in requisition object 3 324. In addition, information from organizational profile 2 is stored in requisition object 3 324. Information in requisition object 3 324 is then transferred to application system 2 328 by the e-procurement system 300.

Thus, as can be seen by FIG. 3, the present invention allows numerous users to have their own unique business rules and otter relevant data implemented by the same e-procurement system. In addition, the same e-procurement system can process each user's transaction and interface with the user's desired application system. Further, if the e-procurement system illustrated in FIG. 3 is implemented in the shared executable hosted model, then a large number of users and application systems can be accommodated with single e-procurement system.

Figure 4:
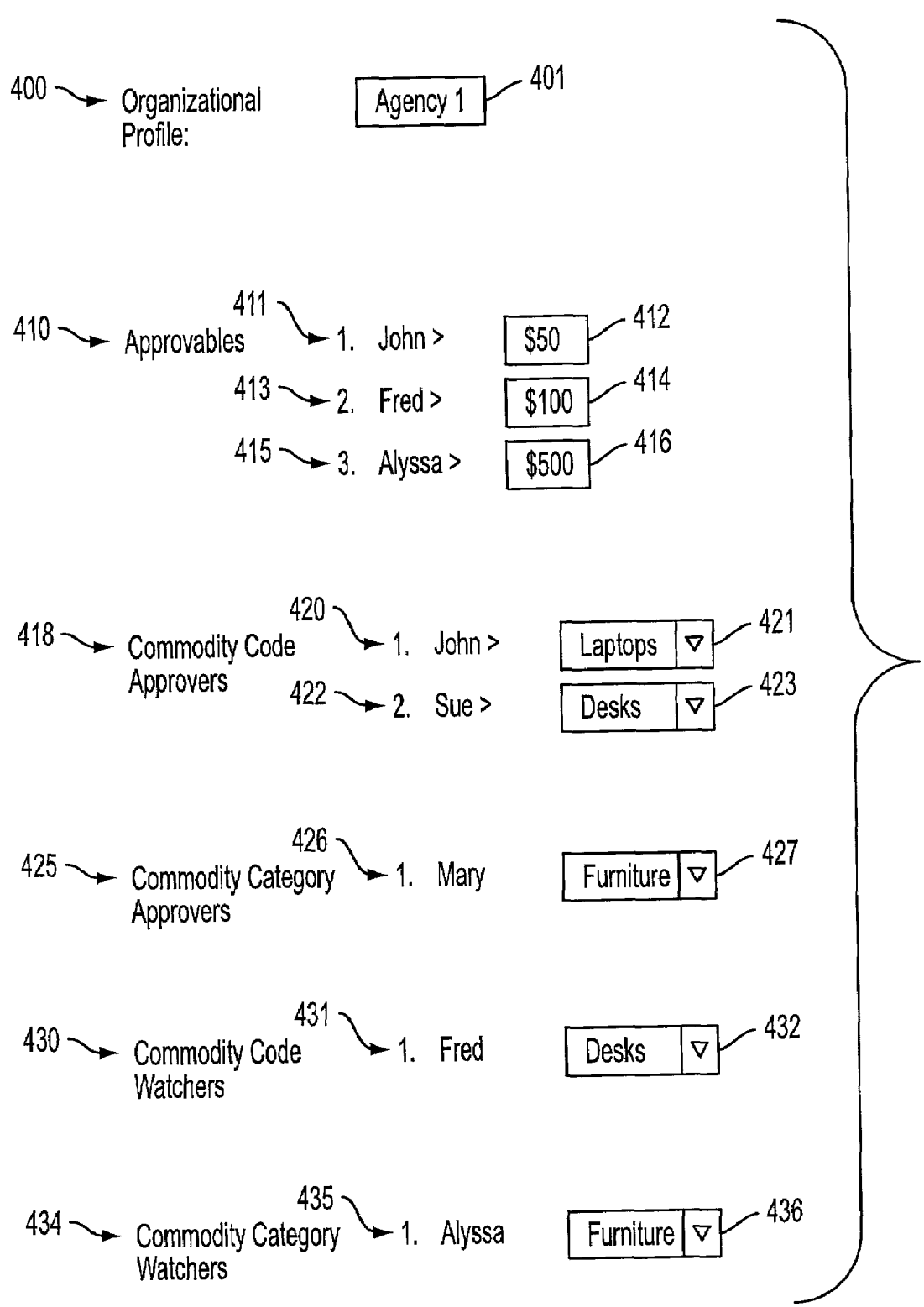
FIG. 4 is a figure illustrating one example of how sample business rules including workflow can be entered, according to an embodiment of the present invention.

FIG. 4 is a figure illustrating one example of how some business rules can be entered into the e-procurement system 400 and stored in the business rules and workflow storage 101. Note that this is just one example of how the information can be entered, as the information can be entered in a various number of ways.

The business rules are entered using an organizational profile editor. The organizational profile editor is a software tool, typically using a graphical user interface, which allows a user to create or modify the fields in an organizational profile. An organizational profile is an object or data file which stores data definitions and business rules, and any other relevant business data for a particular user, group of users, department, agency, office, etc. The tool can be run directly on the user's computer, with the final fields transmitted to the e-procurement system 100 for storage. In the alternative, the tool can be run on the e-procurement system with the fields transmitted from the user to the e-procurement system via any appropriate protocol, such as HTML or XML.

Referring now to FIG. 4, an organizational profile 400 can be entered in a client name field 401. The client name identifies a particular organizational profile and represents a name given to the organization that the following rules will apply to.

A list of approvables 410 can be entered. For each purchase over a specified dollar amount, an approver can be designated. In the example illustrated in FIG. 4, the approver "John" 411 is designated to approve any purchase over $50 412. The approver "Fred" 413 is designated to approve any purchase over $100 414. The approver "Alyssa" 415 is designated to approve any purchase over $500 416. This represents the approval chain wherein John's approval is required first, then Fred's approval is required after John's approval, and then Alyssa's approval is required after Fred's. If John declines approval, then there typically is no need to request approval from Fred and Alyssa. Besides selecting approvers by name, a role, title or job description such as "Information Technology Director" can be listed as the approver. A person with a matching or equivalent role can act as the approver for a purchase.

A list of commodity code approvers 418 can be entered. Each code of purchase is given a "commodity code." Examples of commodity codes are laptops, desks, books, telephones, etc. . . . In the example illustrated in FIG. 4, the approver "John" 420 is designated to approve any purchase of laptops 421. The approver "Sue" 422 is designated to approve any purchase of desks 423. Similarly, besides selecting approvers by name, a role, title or job description such as "Information Technology Director" can be listed as the approver. A person with a matching or equivalent role can act as the approver for a purchase.

A list of commodity category approvers 425 can be entered. Each category of a purchase is given a "commodity category." Commodity categories are similar to the commodity codes discussed above, but are less specific than the commodity codes. Examples of commodity categories are hardware, software, furniture, etc. The commodity codes "laptop" and "monitor" would fall under the commodity category "hardware." In the example illustrated in FIG. 4, the commodity category approver "Mary" 426 is designated to approve any purchase of furniture 427. Since, as stated above, Sue is designated to approve any purchase of desks, and the commodity desks falls under the category furniture, in this example both Sue and Mary would need to approve a purchase of a desk. Similarly, besides selecting approvers by name, a role, title or job description such as "Information Technology Director" can be listed as the approver. A person with a matching or equivalent role can act as the approver for a purchase.

A list of commodity code watchers 430 can be entered. A commodity code watcher is a person who is notified when a purchase is requested for the watcher's designated code. However, the watcher has no active role in the approval. In the example illustrated in FIG. 4, the commodity code watcher "Fred" 431 is designated to be notified upon any request for purchase of desks 432. Besides electing watchers by name, a role, title or job description such as "Office Manager" can be listed as the watcher. A person with a matching or equivalent role would be notified with the request for purchases.

A list of commodity category watchers 434 can be entered. A commodity category watcher, similar to a commodity code watcher, is notified when a purchase is requested for the watcher's designated category. In the example illustrated in FIG. 2, the commodity category watcher "Alyssa" 435 is designated to be notified upon any request for purchase of furniture 436. Similarly, besides selecting watchers by name, a role, title or job description such as "Office Manager" can be listed as the watcher. A person with a matching or equivalent role would be notified with the request for purchases.

Additionally, headers (not shown) can be entered. Payment headers and requisition headers can be entered so that payments and requisitions contain the desired fields. For example, headers may contain information relevant to the user or department, such as the department's name, manager, contact information, etc. As an example, a header containing a department name may be printed on the top of each invoice, so that the invoice can be directed to the proper department.

While the above information represents some information regarding business rules, any other procedures or information relevant for purchases can be included into the organizational profile as well. For example, some entities may require that purchases amounts be allocated according to certain percentages among different departments.

Figure 5:
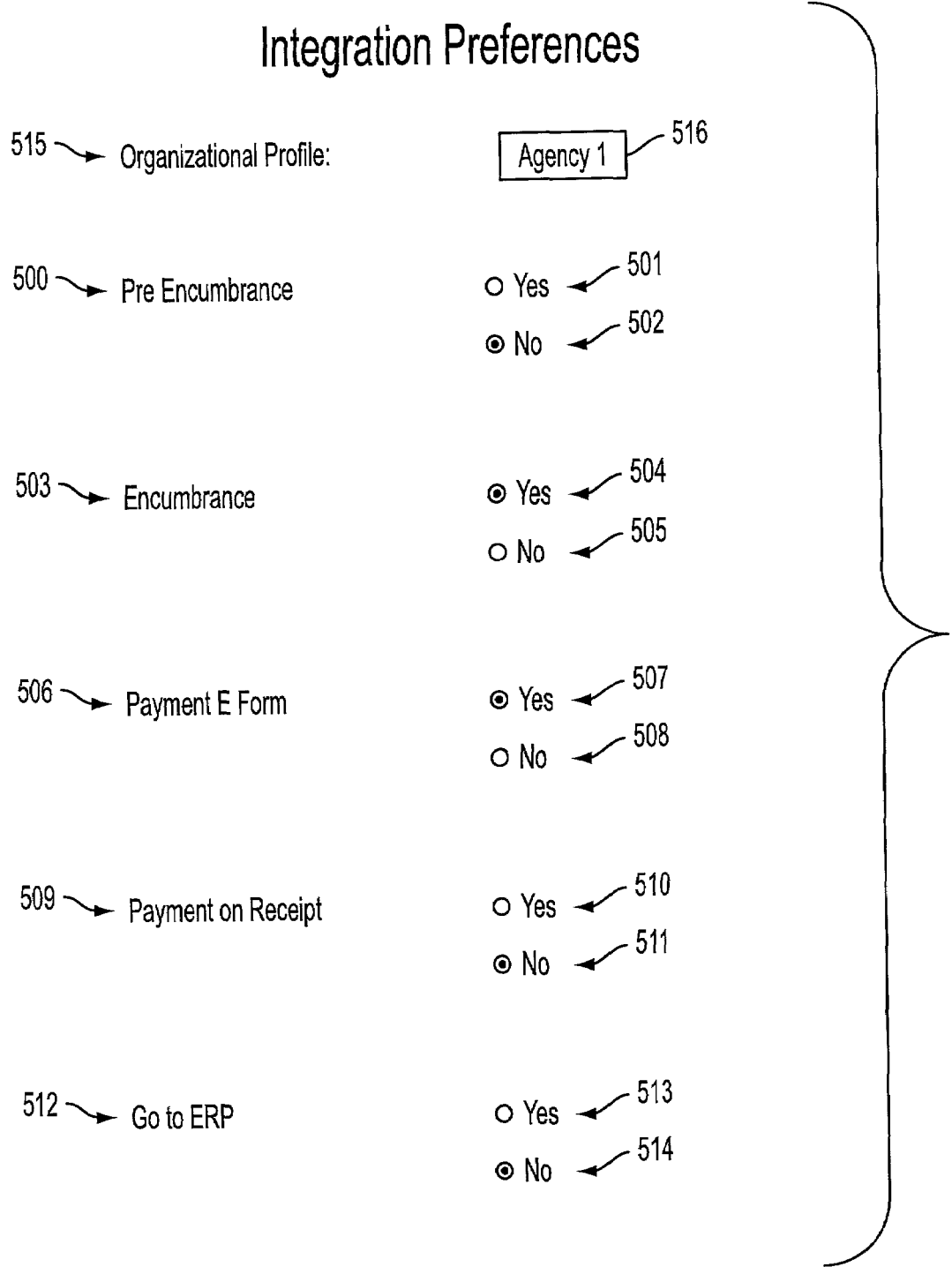
FIG. 5 is a figure illustrating one example of how integration preferences can be entered, according to an embodiment of the present invention.

FIG. 5 is a figure illustrating one example of how integration (or purchase) preferences can be entered into the organization profile editor. When an integration is requested, typically some details of the integration must be included such as financial information transmitted to the financial system in order for the financial system to manage the funds required for the purchase. Integration preferences are preferences regarding how the e-procurement system should interact with an application system for a specific user or organizations.

Referring now to FIG. 5, an organizational profile 515 name can be entered in a client name field 516, to which the below integration preferences will apply. A pre-encumbrance 500 preference can be designated by checking a "yes" checkbox 301 or a "no" checkbox 502. A pre-encumbrance serves to check if the required funds are in the appropriate account. However, no actual money is removed. An encumbrance 503 preference can be designated by checking a "yes" checkbox 504 or a "no" checkbox 505. An encumbrance actually reserves the funds required from the appropriate account, so the needed funds are secured. A paymentEform 506 preference can be designated by checking a "yes" checkbox 507 or a "no" checkbox 308. The paymentEform 506 preference allows actual payment to be made. A payment on receipt 509 preference can be designated by checking a "yes" checkbox 510 or a "no" checkbox 511. A gotoERP 512 preference can be designated by a "yes" checkbox 513 or a "no" checkbox 514. This preference bypasses any of the above types of options and nothing is reserved. The aforementioned payment options are merely exemplary, and other payment options and combinations can also be implemented.

The integration preferences are stored in the organizational profile so that when a purchase is to be completed, the electronic procurement system automatically will carry out the purchase using the chosen integration preference.

TABLE III

Integration Preferences Table

| ClientID | ClientName | Pre-Encumberance | Encumberance | Payment on Receipt | Payment by eForm |
|---|---|---|---|---|---|
| ASU001 | ADV_01 | Yes | Yes | Yes | No |
| ASU002 | ADV_02 | No | Yes | No | Yes |

Table III, entitled "Integration Preferences Table," is one possible example of how each organizational profile is defined and contains the organizational profile's respective integration preferences. The "ClientID" field identifies a particular organizational profile, and the "ClientName" field designates a given name for the respective ClientID. The "Pre-Encumberance," "Encumberance," "Payment on Receipt," and "Payment by eForm" all represent requisition preferences.

Figure 6:
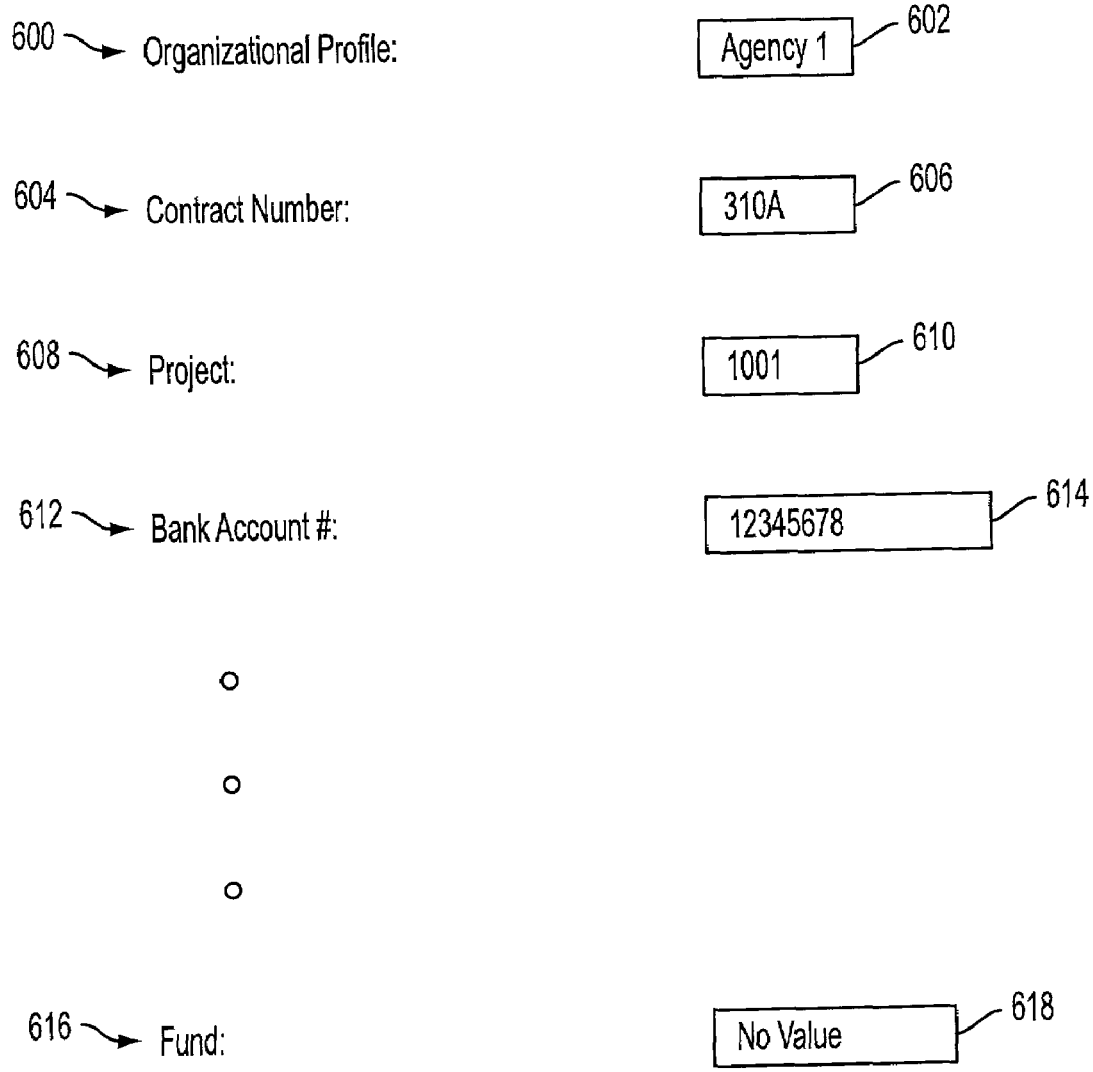
FIG. 6 is a figure illustrating one example of how accounting preferences can be entered into the organization profile editor, according to one embodiment of the present invention.

FIG. 6 is a figure illustrating one example of how accounting preferences can be entered into the organization profile editor, according to one embodiment of the present invention. Once the extended fields have been defined, default values can be established. Defaults can be defined at the organizational profile level for e-procurement data and extended fields. For example, defaults can be entered for the requisition and payment forms to ensure that accurate information is captured.

Referring now to FIG. 6, an organizational profile 600 name can be entered in a client name field 602, to which the below accounting preferences will apply.

Sample accounting information can include a contract number 604 with a respective contract number field 606, a project 608 with a respective project field 610, a bank account number 612 with a respective bank account number field, and a fund 616 with a respective find field 618.

The data fields illustrated in FIG. 6 are merely illustrative, as any fields relevant to the particular accounting needs of the parties involved can be included. For example, the desired application system may require certain fields before it can process a transaction. When a transaction is carried out with an application system, these data fields are used in communication with the application system.

Figure 7:
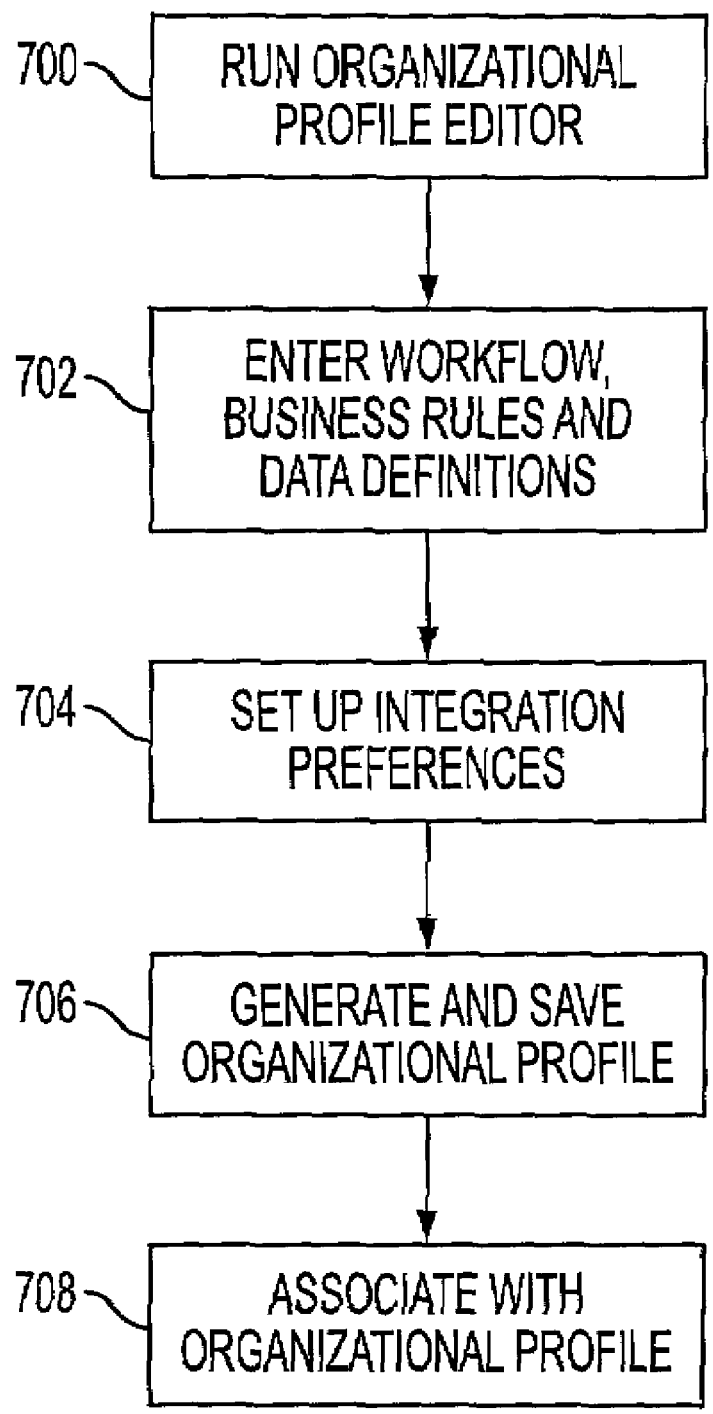
FIG. 7 is a flowchart illustrating a typical process of setting up an organization profile, according to an embodiment of the present invention.

FIG. 7 is a flowchart illustrating a typical process of setting up an organization profile. It is noted that this is just one example, and numerous variations and embodiments regarding setting up an organizational profile can be implemented. First, in operation 700, the organizational profile editor is run and the fields are defined for the organizational profile, for example as illustrated in FIG. 4.

After the organizational profile editor is run in operation 700, operation 702 is performed in which the user enters the workflow and business rules (and also possibly data definitions). While the entries for each field are defined by the user, the names and numbers of the actual fields themselves are typically predefined by a field editor. Thus, typically, a user can use the organizational profile editor to enter definitions for the fields but not create new fields not already present. New fields can be created by a system administrator or anyone that has access to the field editor. While it is possible, typically the typically user would not have access to the field editor.

After the business rules, data definitions and workflow are entered in operation 702, operation 704 is performed in which the user sets up the integration preferences (or payment options). Any other relevant information (headers, etc . . . ) can also be entered.

After completion of operation 704, operation 706 is performed which generates and saves the organizational profile on the e-procurement system. The organizational profile is saved as a data file (or object), and contains all of the information entered in the previous operations.

In order for the user to utilize this organizational profile, the user must associate with the newly created organization profile. Therefore, from operation 706 the process moves to operation 708, wherein the user associates with an organizational profile. One way the association can be initiated is by executing an "organizational chooser" program or process on the e-procurement system which allows a user to see all of the available organizational profiles and choose the one he or she wants. The operation of choosing the organizational profile can also be included in the organizational profile creator tool. The e-procurement system stores an identification for each user and the user's associated organization profile. Typically, a user can only be associated with one organizational profile at a time.

Figure 8:
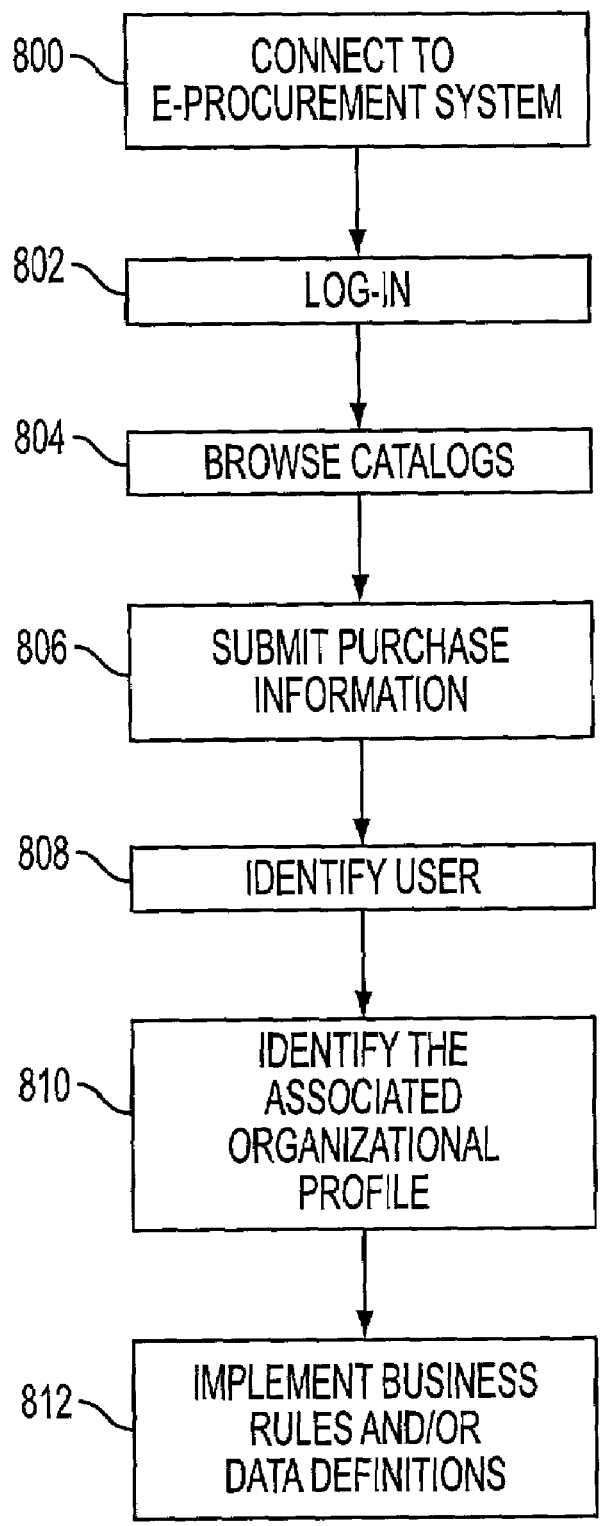
FIG. 8 is a flowchart illustrating one typical process of how a user can make a requisition, according to an embodiment of tie present invention.

FIG. 8 is a flowchart illustrating one typical process of how a user (typically an employee of a government or private entity) can make a requisition (purchase), after the user is associated with an organizational profile.

Referring now to FIG. 8, the first operation the user performs is operation 800, wherein the user connects to the e-procurement system 100. The connection is accomplished typically by a computer communications network such as the Internet, and the communications to and from the e-procurement system can be accomplished by any available protocol, for example such as HTML or XML.

Once the user has connected to the e-procurentent system in operation 800, the user performs operation 802, wherein the user can log in. The login typically consists of entering login information such as a user name and a password, which can also be accomplished automatically on the user's computer.

From operation 802, the process moves to operation 804, wherein the user browses catalogs. The e-procurement system transmits catalog information, including product prices and descriptions, to the user via a computer communications network. Catalogs can be stored in catalog storage on the e-procurement system. The catalogs can be typically transmitted to the e-procurement system directly from a variety of suppliers, or from a system which maintains catalogs from various suppliers. For example, Ariba operates a network that receives and transmits catalogs from various suppliers. A system administrator on the e-procurement system may select which catalogs users may have access to, or in the alternative which catalogs users may not have access to.

From operation 804, the process moves to operation 806, wherein the user selects the items for purchase and submits a purchase request to the e-procurement system. Purchase characteristics of the purchase request can be identified in the e-procurement system which include, but not limited to, any characteristics relevant to the purchase such as quantity, price, category of goods, etc. At this point, the user has typically completed his or her purchase request.

After operation 806, the e-procurement system then performs operations to implement the purchase request. At operation 808, the e-procurement system first identifies the user. This can typically be accomplished by associating the login information with a particular user. The user may also be identified from information included in the submission from the user.

Once the user is identified in operation 808, the process moves to operation 810, wherein the e-procurement system then identifies the associated organizational profile. This can typically be accomplished by using a table storing users and the user's respective associated organizational profile.

From operation 810, the e-procurement system then proceeds to operation 812 which implements the business rules, workflow and data definitions included in the user's associated organizational profile. The business rules, data definitions and workflow can typically be stored as an object on the e-procurement system which can be directly accessed by processes written for the object which implement the rules. Thus, the business rules, data definitions and workflow can be accessed and implemented by the e-procurement system without the need for any hard coding or recompiling of the software. The business rules, workflow and data definitions can therefore be dynamically maintained by the users associated with the organization profile storing the business rules, workflow and data definitions.

Figure 9:
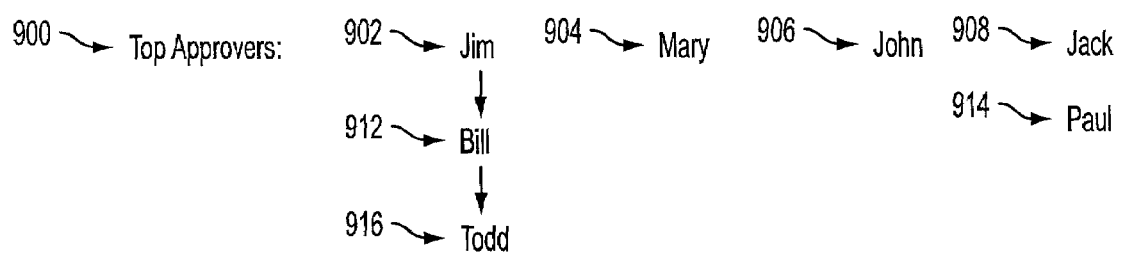
FIG. 9 illustrates one example of a data table obtained from the organizational profile in order to identify the proper approval chain, according to an embodiment of the present invention.

FIG. 9 is a figure illustrating one example of a table obtained from the organizational profile in order to identify the proper approval chain for the business rules and workflow stored in the organizational profile.

Assume a requested transaction in which the approval of Jim, Mary, John, and Jack is required. The workflow dictates in this particular example that once Mary's approval is obtained, then Bill's Approval is needed, and then Todd's approval is needed. Also, once Jack's approval is obtained, then Paul's approval is needed.

Referring now to FIG. 9, the first approvers 900 are listed as Jim 902 Mary 904 John 906 and Jack 908. The next level of approvers 910 is listed as Bill 912, Paul 914, and Todd 916. As illustrated in the FIG. 9 Bill's approval is needed only after Jim's approval is obtained, and Todd's approval is needed only after Bill's approval is obtained. Also, Paul's approval is needed only after Jack's approval is obtained.

In addition to the storing of names of approvers, the organization profile can also store other relevant information (not shown in FIG. 9) associated with each approver such as, for example, the approver's e-mail address, address, telephone number, account number, etc

TABLE IV

Workflow Approvers

| ClientID | ClientName | Amount | Approver | Contact |
|----------|------------|--------|----------|---------|
| ASU001 | ADV_01 | $50 | John | John@abc.com |
| ASU001 | ADV_01 | $100 | Fred | Fred@abc.com |
| ASU001 | ADV_01 | $500 | Alyssa | Alyssa@abc.com |

Table IV, entitled "Workflow Approvers," is one example of a data structure used to store workflow in an organizational profile for a particular ClientID (or organizational profile). In this case, any purchase over $50 needs to be approved by John. Any purchase over $100 then needs to also be approved by Fred. Any purchase over $500 then needs to also be approved by Alyssa. In this example, a contact-e-mail is also given so that the e-procurement system can contact the approver automatically and request approval. Of course, other contact methods can be used as well, as discussed in other parts of this document.

Figure 10:
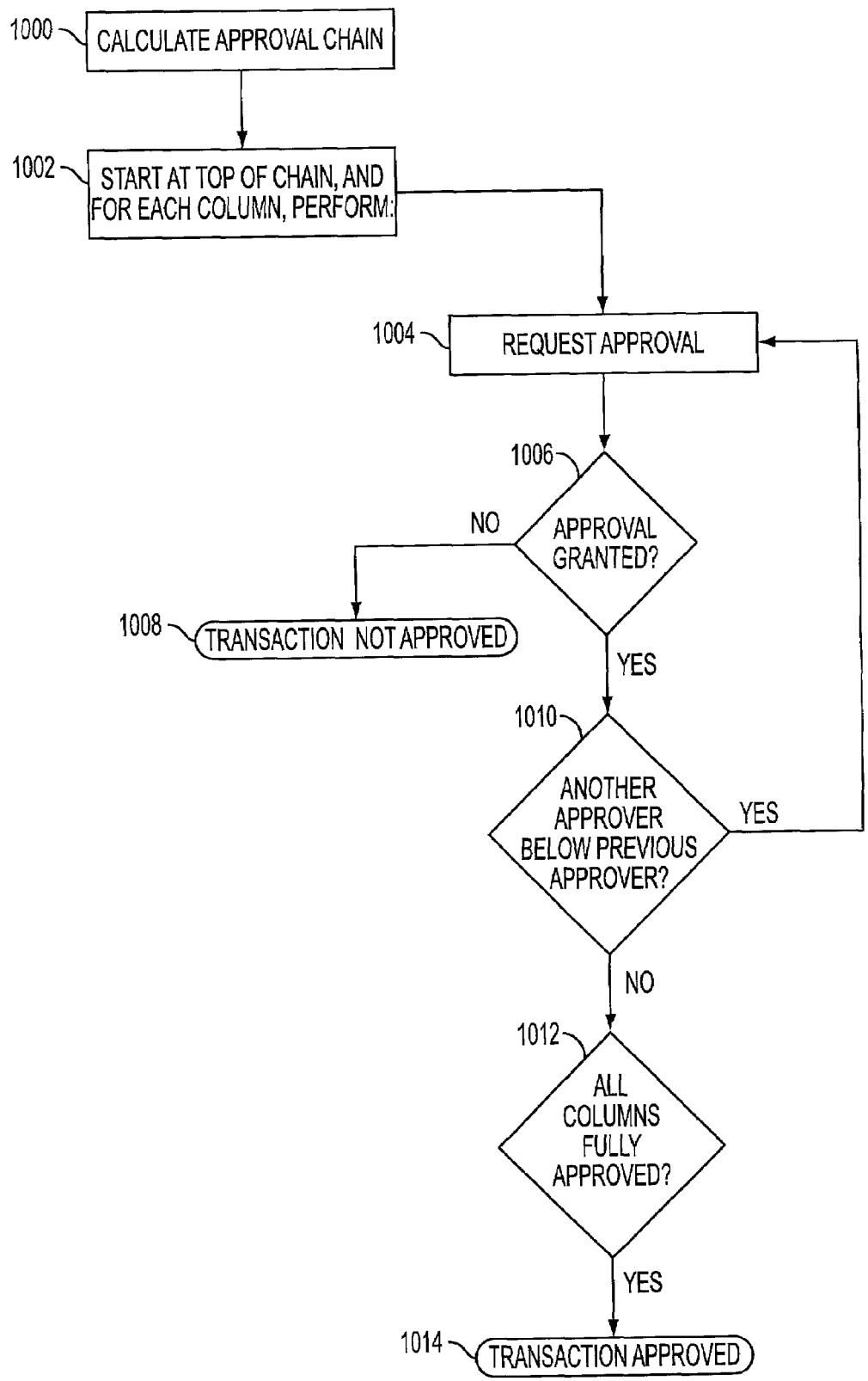
FIG. 10 is a flowchart illustrating one typical example of how business rules including workflow are implemented, according to an embodiment of the present invention.

FIG. 10 is a flowchart illustrating one typical example of how the business rules and workflow from operation 812 are actually implemented, in order to obtain an entity's approval for a purchase. Note that the approval process in FIG. 10 only relates to approvals within the government or private entity, but not external approvals such as those requiring the purchasing of funds.

Referring now to FIG. 10, the first operation in the figure is operation 1000, wherein the e-procurement system calculates the approval chain from the business rules and workflow, for example as illustrated in the example of FIG. 9. The approval chain is identified by reading the organizational profile and identifying the approvers from the organizational profile that are associated with the purchase characteristics (from operation 806).

For example, assume the workflow stored in the organizational profile dictates that Jack must approve every purchase over $100, and subsequently Paul must approve every purchase over $500. If the purchase characteristics includes a purchase amount of $1,000, then the e-procurement system identifies Jack at the top level of the approval chain, and Paul at the next level (because Jack's approval amount $500 is greater than Paul's).

Once the approval chain is calculated in operation 1000, then the e-procurement system proceeds to operation 1002 which starts at the top of the approval chain, and for each column in the approval chain, performs operations 1004-1014. In FIG. 9, the approvers on top of the approval chain ("top approvers") are Jim 902, Mary 904, John 906, and Jack 908.

From operation 1002, the e-procurement system then executes operation 1004 which requests approval from an approver. The approval request can typically be sent by e-mail, although any other communication method can be used, such as telephone message, fax, post-office mail, etc.

From operation 1004, the e-procurement system proceeds to operation 1006 which checks to see if the approval is granted 1006 by the previous approver. If the approval is not granted, then the process proceeds to operation 1008 which results in the transaction not being approved. If the transaction is not approved, then typically the e-procurement system will inform the original purchaser and the approver(s) which did not approve the transaction.

From operation 1006, if the approval is granted, then the process proceeds to operation 1010 which checks to see if there is another approver below the previous approver in the approval chain. If there is another approver, then the process returns to operation 804 which requests approval for the next approver.

From operation 1010, the process proceeds to operation 1012 which checks if all threads (or columns) in the approval chain are fully approved. If the last approver in each thread approves the transaction, then the process proceeds to operation 1014 which results in the transaction being approved.

Note that the above processes 1004-1012 are typically performed in parallel, not serial. For example, using the example of FIG. 9, approval would be first sought from Jim, Mary, John, and Jack simultaneously. When Jack indicates his approval, an approval request is automatically sent to Paul, regardless of whether Jim, Mary, or John have approved the transaction yet. Thus, the above process is implemented efficiently, without unnecessary delays.

Once the purchase is approved by the appropriate approvers in the government or private entity, then an integration (completing the purchase after all the required approvers have approved the transaction) is performed. The integration includes managing the appropriate financial aspects of the transaction and communicating the necessary information with the supplier to complete the transaction.

Figure 11:
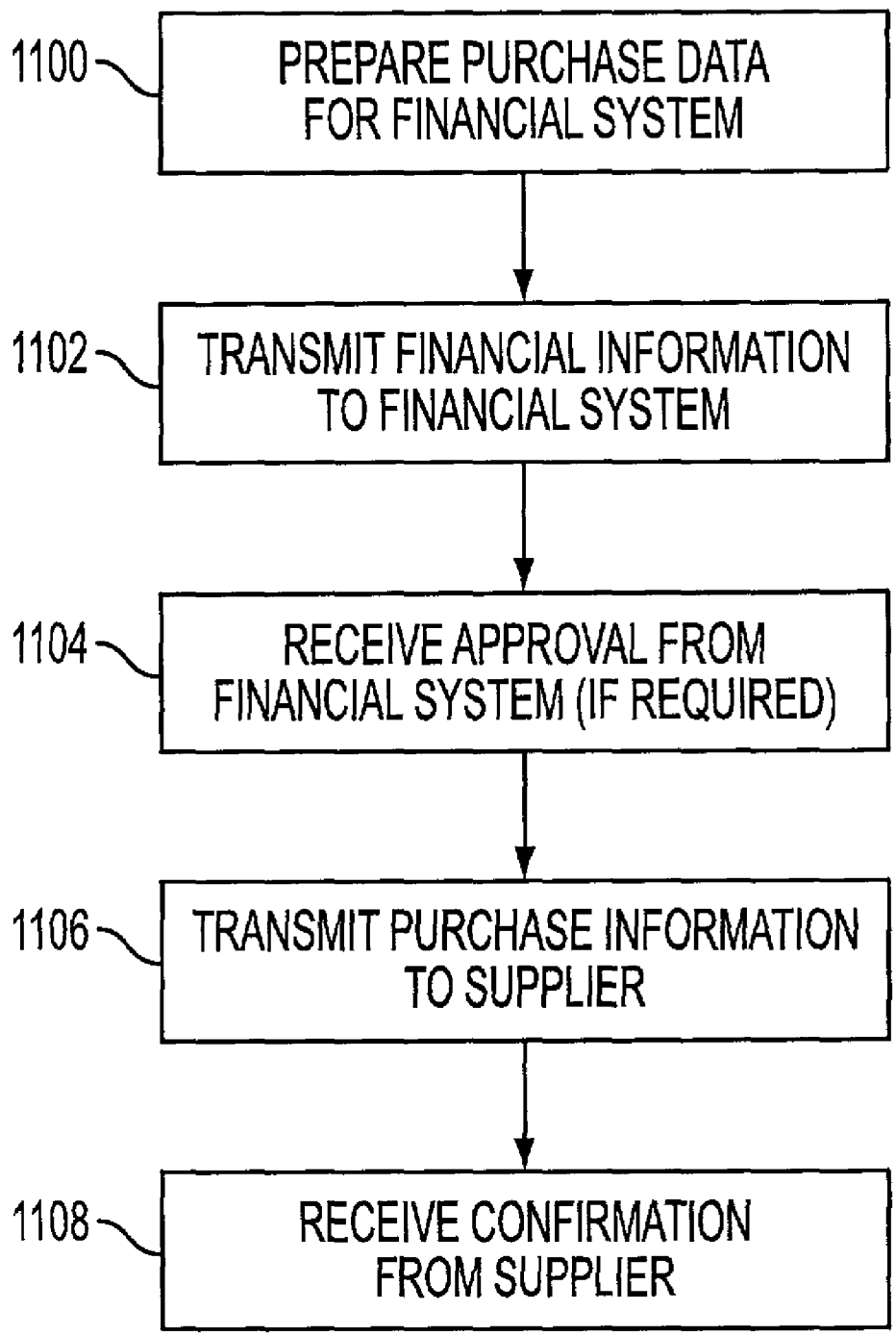
FIG. 11 is a flowchart illustrating one example of how the integration can be performed, according to an embodiment of the present invention.

FIG. 11 is a flowchart illustrating one example of how the integration can be performed.

Referring now to FIG. 11, in order for the purchase data to be transmitted and received by the appropriate financial system (ERP system, back office system, etc . . . ), in operation 1100 the e-procurement system prepares financial information for the financial system using the organization profile. The financial information may typically include such information as the item purchased, the amount involved, the integration preferences, account numbers, headers, etc. The financial systems typically used for the transactions described herein require the financial information data to be submitted in a format the financial system can read. For example, the financial system may require certain fields but not others, and the field lengths may vary, etc. The e-procurement system prepares the financial information to conform to the particular format the financial system requires.

Once financial information is prepared in operation 1100, then the process continues to operation 1102 which transmits the financial information to the financial system.

From operation 1102, the e-procurement system may receive approval or denial from the financial system in operation 1104. A "two-way integration" is an embodiment where there is communication from the financial system back to the e-procurement system. Depending on the integration preference chosen in the purchase data, an approval may be required from the financial system. For example, if the integration preference is an encumbrance, than the financial system will have to successfully encumber the funds before sending an approval back to the e-procurement system. If the requested funds are not present in the designated account, then the encumbrance request will be denied. On the other hand, an approval may not be required from the financial system if the "GotoERP" option is designated as the integration preference, which does not reserve any funds.

From operation 1104, upon the receipt of any necessary approval from the financial system, the process proceeds to operation 1106, which transmits the purchase information to the supplier.

The financial system can transmit payment information to the supplier (not pictured). Therefore, the supplier receives the purchase information from the e-procurement system and the payment information from the financial system. If the supplier approves the transaction based on all the information the supplier has received, then the supplier typically sends a confirmation to the e-procurement system that the purchase information is received and approved. Thus from operation 1106, the process moves to operation 1108 wherein the e-procurement system thus receives confirmation from the supplier that the purchase is approved (or denied if there is a problem). It is now up to the supplier to deliver the goods.

Once the goods are delivered by the supplier, the supplier may also provide a receipt document, such as an invoice, to a receiving party. Information from the receipt document can be entered into the e-procurement system so that the e-procurement system can keep track of what is received.

Depending on the integration (purchase) option selected in the organization profile, payment to the supplier may not be made until the goods are actually received. For example if the "payment upon receipt" option is stored in the organizational profile for the particular user that requested the transaction, payment is made to the supplier after the goods are received. This is accomplished automatically after invoice information is entered into the e-procurement system, by communicating a transaction with the financial system requesting that the supplier be paid. The transaction communicated to the financial system typically includes information from the invoice so the financial system and supplier can identify which purchase this payment corresponds to. Thus, in this mode of operation, instead of transmitting purchase data to the financial system in operation 1102, a similar operation is performed after the product is received from the supplier (not pictured).

Moreover, the two-way integration discussed above (an integration where the financial system transmits information back to the e-procurement system), is not limited to the approval of a financial request. A two-way integration can be used to pass any relevant information from the financial system back to the e-procurement system.

Different financial systems may have different purposes, and also may require different fields. For example, one financial system may need to receive fields that another financial system does not require, and vice versa. The e-procurement system, upon sending a transaction to one of the financial systems, identifies and transmits the fields that are needed by the particular financial system, which can be stored in the organizational profile and the data definitions contained therein.

Therefore, one e-procurement system can transact with a plurality of application systems without requiring extra hardware or processes to interface with multiple application systems. Meanwhile, the operations (such as identifying and transmitting the required fields) required for interacting with multiple financial systems remain "invisible" to the buyers, so that the buyers are not burdened with these operations.

The single executable of the shared executable hosted e-procurement system can typically transact with each of the application systems sequentially, as opposed to maintaining a dedicated executable for each application system. The e-procurement system can use an organizational profile to identify a particular application system to be accessed, which can then allow the e-procurement system to retrieve information required to interact with the application system. The information, for example, can comprise fields required to be transmitted to the application system. When a different application system is needed by the e-procurement system, the one executable of the electronic procurement system then retrieves the necessary information for that application and transacts with that application system.

Therefore, the present invention provides a government or private entity a way to maintain dynamic data definitions and business rules across the organizational structure easily, without any additional hard coding or compiling/recompiling required. The data definitions and/or business rules are "dynamically" maintained in that the data definitions and/or business rules can be created/modified by a human whereupon the actual implementation of these changes is automatically performed. Implementing these data definitions and/or business rules for multiple users and multiple financial systems in a single executable on an e-procurement system provides simplicity and conservation of resources.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:
dynamically maintaining a plurality of organizational profiles containing data definitions which define data fields required to implement user requested transactions, a plurality of users each being associated with a particular organizational profile; and
providing an executable on a shared executable hosted e-procurement system, the executable being shared by the plurality of users to implement user requested transactions of the plurality of users, the executable implementing a respective user requested transaction of a respective user with an application system by accessing the organizational profile associated with the respective user and transmitting, to the application system, data fields defined by the data definitions contained in the accessed organizational profile and required by the application system to implement the respective user requested transaction.

2. An apparatus comprising:
a plurality of financial systems, wherein a plurality of users are each associated with a respective organizational profile of a plurality of dynamically maintained organizational profiles, each profile containing integration preferences; and
a shared executable hosted e-procurement system storing the plurality of organizational profiles, wherein
the integration preferences contained in a respective organization profile determine how the shared executable hosted e-procurement system interacts with the respective financial systems for the respective organization profile or for the users associated with the respective organizational profile, and
the shared executable hosted e-procurement system has an executable which is shared by the plurality of users to implement user requested transactions of the plurality of users, the executable implementing a respective user requested transaction by a respective user with a selected financial system by accessing the organizational profile associated with the respective user and interacting with the selected financial system in accordance with the integration preferences contained in the accessed organizational profile.

3. An apparatus as recited in claim 2, wherein
the organizational profiles contain data fields required by financial systems to implement user requested transactions, and
the shared executable hosted e-procurement system transmits, to the selected financial system from the accessed organizational profile, data fields required by the selected financial system to implement the respective user requested transaction.

4. A method comprising:
dynamically maintaining a plurality of organizational profiles containing integration preferences, a plurality of users each being associated with a particular organizational profile; and
providing an executable on a shared executable hosted e-procurement system, the executable being shared by the plurality of users to implement user requested transactions of the plurality of users, the executable implementing a respective user requested transaction by a respective user with an application system by accessing the organizational profile associated with the respective user and implementing the integration preferences contained in the accessed organizational profile, wherein
the integration preferences contained in a respective organizational profile determine how the shared executable hosted e-procurement system interacts with the application system for the respective organizational profile or for the users associated with the respective organizational profile, to thereby implement user requested transactions via the executable on the shared executable hosted e-procurement system,
the organizational profiles include data fields needed by the application system to implement the respective user requested transaction, and
the method further comprising:
transmitting the needed data fields to the application system by the shared executable hosted e-procurement system.

5. A method comprising:
dynamically maintaining a plurality of organizational profiles containing integration preferences, a plurality of users each being associated with a particular organizational profile; and
providing an executable on a shared executable hosted e-procurement system, the executable being shared by the plurality of users to implement user requested transactions of the plurality of users, the executable implementing a respective user requested transaction by a respective user with an application system by accessing the organizational profile associated with the respective user and implementing the integration preferences contained in the accessed organizational profile, wherein
the integration preferences contained in a respective organizational profile determine how the shared executable hosted e-procurement system interacts with the application system for the respective organizational profile or for the users associated with the respective organizational profile, to thereby implement user requested transactions via the executable on the shared executable hosted e-procurement system,
the shared executable hosted e-procurement system implements a respective user requested transaction by a respective user via the executable by accessing the organizational profile associated with the respective user and transmitting financial information to the application system in accordance with the integration preferences contained in the accessed organization profile,
the application system is a financial system which manages funds required for the respective user requested transaction in accordance with the transmitted financial information, the organizational profiles includes data fields needed by the application system to manage the funds for the respective user requested transaction, and the method further comprising:

transmitting the needed data fields to the application system by the shared executable hosted e-procurement system.

6. A method comprising:

dynamically maintaining a plurality of organizational profiles containing integration preferences, a plurality of users each being associated with a particular organizational profile; and providing an executable on a shared executable hosted e-procurement system, the executable being shared by the plurality of users to implement user requested transactions of the plurality of users, the executable implementing a respective user requested transaction by a respective user with an application system by accessing the organizational profile associated with the respective user and implementing the integration preferences contained in the accessed organizational profile, wherein the integration preferences contained in a respective organizational profile determine how the shared executable hosted e-procurement system interacts with the application system for the respective organizational profile or for the users associated with the respective organizational profile, to thereby implement user requested transactions via the executable on the shared executable hosted e-procurement system, and the integration preferences include encumbrance and payment preferences.

7. A method comprising:

dynamically maintaining a plurality of organizational profiles containing integration preferences, a plurality of users each being associated with a particular organizational profile; and providing an executable on a shared executable hosted e-procurement system, the executable being shared by the plurality of users to implement user requested transactions of the plurality of users, the executable implementing a respective user requested transaction by a respective user with an application system by accessing the organizational profile associated with the respective user and implementing the integration preferences contained in the accessed organizational profile, wherein the integration preferences contained in a respective organizational profile determine how the shared executable hosted e-procurement system interacts with the application system for the respective organizational profile or for the users associated with the respective organizational profile, to thereby implement user requested transactions via the executable on the shared executable hosted e-procurement system, the shared executable hosted e-procurement system implements a respective user requested transaction by a respective user via the executable by accessing the organizational profile associated with the respective user and transmitting financial information to the application system in accordance with the integration preferences contained in the accessed organization profile, the application system is a financial system which manages funds required for the respective user requested transaction in accordance with the transmitted financial information, and the integration preferences include encumbrance and payment preferences.

8. An apparatus comprising:

a plurality of application systems, wherein a plurality of users are each associated with a respective organizational profile of a plurality of dynamically maintained organizational profiles, each profile containing integration preferences and data fields; and a shared executable hosted e-procurement system storing the plurality of organizational profiles, wherein the integration preferences contained in a respective organization profile determine how the shared executable hosted e-procurement system interacts with the respective application systems for the respective organization profile or for the users associated with the respective organizational profile, and the shared executable hosted e-procurement system has an executable which is shared by the plurality of users to implement user requested transactions of the plurality of users, wherein the executable implements a respective user requested transaction by a respective user with a selected application system of the plurality of application systems by accessing the organizational profile associated with the respective user and interacting with the selected application system in accordance with the integration preferences contained in the accessed organizational profile, and the shared executable hosted e-procurement system transmits, to the selected application system, data fields contained in the accessed organization profile and that are required for the selected application system to implement the respective user requested transaction.

9. The apparatus as recited in claim 8, wherein the application system is a financial system which manages funds required for the respective user requested transaction in accordance with the transmitted data fields.

* * * * *

UNITED STATES PATENT AND TRADEMARK OFFICE
CERTIFICATE OF CORRECTION

PATENT NO.        : 7,499,877 B2
APPLICATION NO.   : 09/788611
DATED             : March 3, 2009
INVENTOR(S)       : Richard Carr et al.

It is certified that error appears in the above-identified patent and that said Letters Patent is hereby corrected as shown below:

Column 5, Line 10, change "system" to --system.--.

Column 5, Lines 46-47, change "embodiment;" to --embodiment--.

Column 5, Line 67, change "tie" to --the--.

Column 7, Line 22, change "(enough" to --enough--.

Column 9, Line 28, change "waits" to --wants--.

Column 11, Line 3, change "otter" to --other--.

Column 13, Line 50, change "find" to --fund--.

Column 14, Line 1, change "(entries" to --entries--.

Column 14, Line 58, change "e-procurentent" to --e-procurement--.

Column 15, Line 51, change "Approval" to --approval--.

Column 15, Line 65, change "etc" to --etc.--.

Signed and Sealed this

Fourteenth Day of July, 2009

JOHN DOLL
*Acting Director of the United States Patent and Trademark Office*